Figure 1:
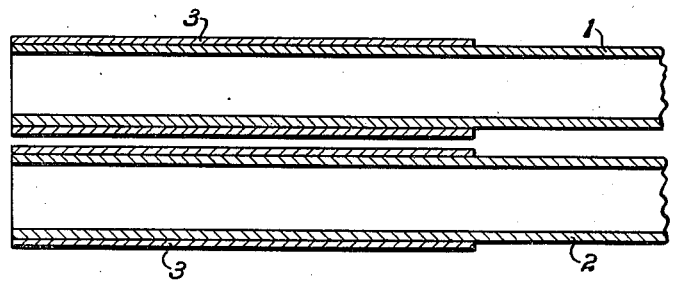

July 29, 1941. W. RIEGER 2,250,879

PROCESS FOR MAKING RETURN BENDS

Filed Aug. 30, 1938

INVENTOR
WILHELM RIEGER
BY
ATTORNEY

Patented July 29, 1941

2,250,879

UNITED STATES PATENT OFFICE 2,250,879

PROCESS FOR MAKING RETURN BENDS

Wilhelm Rieger, Kassel-Wilhelmshohe, Germany, assignor to The Superheater Company, New York, N. Y.

Application August 30, 1938, Serial No. 227,473
In Germany September 30, 1937

1 Claim. (Cl. 29—157.6)

The invention relates to a return bend connecting pipe lengths such as used for example in heat exchangers, particularly superheaters, feed water heaters, etc., which are heated by products of combustion, and to a process for fabricating such return bends. In order to prolong the life of return bends in such heat exchange devices, various suggestions have been made in the past. It has for instance been suggested to place on the return bend a protective cap of considerable thickness. This suggestion was intended for superheaters used in locomotives, where the constituent tubular units or elements are located in flues with some of the return bends directed toward the fire box and therefore exposed to attack by mechanical abrasion by cinders and also to the corroding effect of the gases themselves. Further, it has been proposed in the past to make the return bend in such installations, and perhaps even that part of the pipe lengths themselves which is exposed to the hottest of the gases, out of heat resistant metal. This, however, has two serious drawbacks. The heat resistant material is relatively expensive as compared with ordinary material of which the remainder of the superheater is made, and, in addition, the fabrication of return bends out of heat resistant material by a hammer forge process presents difficulties if the ends of the tubes are to be fabricated directly into a return bend unitary with the tubes. For this reason the return bend has in these cases been made by a process involving a fusion weld. In any case there is required a further weld connecting each of the tubes to the return bend.

The present invention offers a new return bend and a process for making it which obviates the drawbacks involved in the protected return bends used in the past and in the process of making them.

The return bend in accordance with the present invention is characterized by a protective shell of heat resistant and corrosion resistant metal, this shell being secured to the end portions of the tubes themselves through pressure forging, i. e., forging by means of hammering or pressing with the parts raised to a forging heat.

The process in accordance with the present invention consists in placing a sleeve of heat and corrosion resistant metal on each of the tube ends which are to be connected and then connecting the ends into a unitary return bend, for example, by the known process involving slitting the portions of the walls which face each other for a certain distance inward from the end, bending out the portions adjacent to the slits, and uniting them to each other after they have been heated to forging heat, these operations being performed by means of suitable dies.

Figure 2:
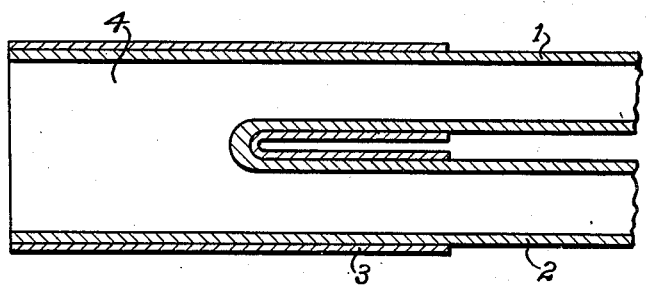
Figure 3:
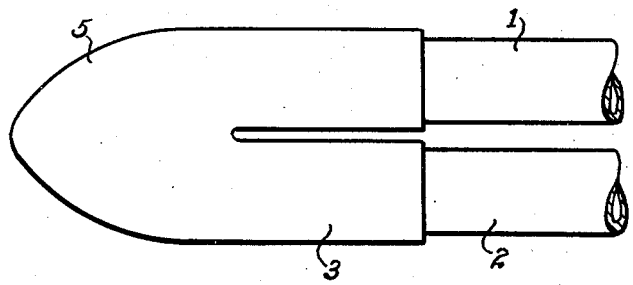

The invention will be more fully explained in connection with the accompanying drawing, in which Fig. 1 shows the two pipe ends which are to be connected, the protective sleeve being in place on each end; Fig. 2 shows the two pipes connected by the steps briefly referred to above, the end of the return bend still being open; and Fig. 3 shows the return bend completed, the end having been closed.

The ends of pipes 1 and 2 to be connected to each other by a return bend are shown in Fig. 1. In accordance with the present invention each of these ends is provided with a protective sleeve 3 of heat resistant and corrosion resistant metal which is preferably secured in place by shrinking it on, or in any other known way, such as rolling or pressing. The two ends are then raised to forging heat, the temperature to which the entire piece, including the pipe ends 1 and 2 as well as the enclosing sleeves 3, are brought, being the upper limit of the proper forging heat for the pipes. The ends, after having thus been heated, are united into a unitary return bend 4 (Fig. 2), this being preferably done in the well-known process outlined above, involving the use of a die into which the tubes are placed, and a plunger which is introduced from the end, the walls facing each other being slit, the portions of the walls adjacent to the slit being bent outward and those of one pipe connected to those of the other. By these steps an open ended structure 4 is fabricated which is given its final shape as at 5 in Fig. 3 by a process which is also in common use.

By heating the ends of the tubes 1 and 2 to the upper limit of the forging heat for the usual pipe material, an even more intimate connection of the sleeves 3 with the tubes 1 and 2 results during the work done on the tubes as described, than was effected originally by shrinking these sleeves on the tubes. It is possible that during the fabrication as above described the sleeves 3 may not be perfectly welded to each other but this is of no consequence as long as the portions of the tubes 1 and 2 are perfectly connected, because the union of the sleeves 3 to each other is in no way depended upon for tightness and their protective effect is substantially equally good whether the weld between these sleeves is perfect or not. The protection to be afforded by the sleeves 3 and the protective cap formed of them during the process depends principally upon their ability to protect against the mechanical action of cinders and the corroding action of the gases. The thickness of the sleeve walls is chosen accordingly and as little of the expensive material is therefore used as is consistent with this purpose. Keeping the protective sleeves as thin as possible has the further advantage of diminishing the amount by which the gas passage through the flue in which the return bend is positioned is restricted.

The process can obviously also be applied where more than two tubes are to be connected into a common return bend structure.

If required, the end may be repeatedly heated while the return bend is being fabricated.

What I claim is:

The process for fabricating return bends, comprising placing on each of the tubes to be connected by the return bend a sleeve of metal of the desired protective character, heating each of the tubes with their sleeves to a welding heat, slitting each tube and its sleeve for a distance from its end, bending out the portions of each tube and sleeve adjacent to the slit, welding the edges of the bent-out portions of one tube and sleeve to the corresponding edges of the other, and finally closing the end of the resulting structure by swaging, whereby there is formed a return bend enclosed in a casing of the protective metal.

WILHELM RIEGER.